June 13, 1944. B. M. HYMAN ET AL 2,351,515
CORN PICKER
Filed Jan. 2, 1942 2 Sheets-Sheet 1
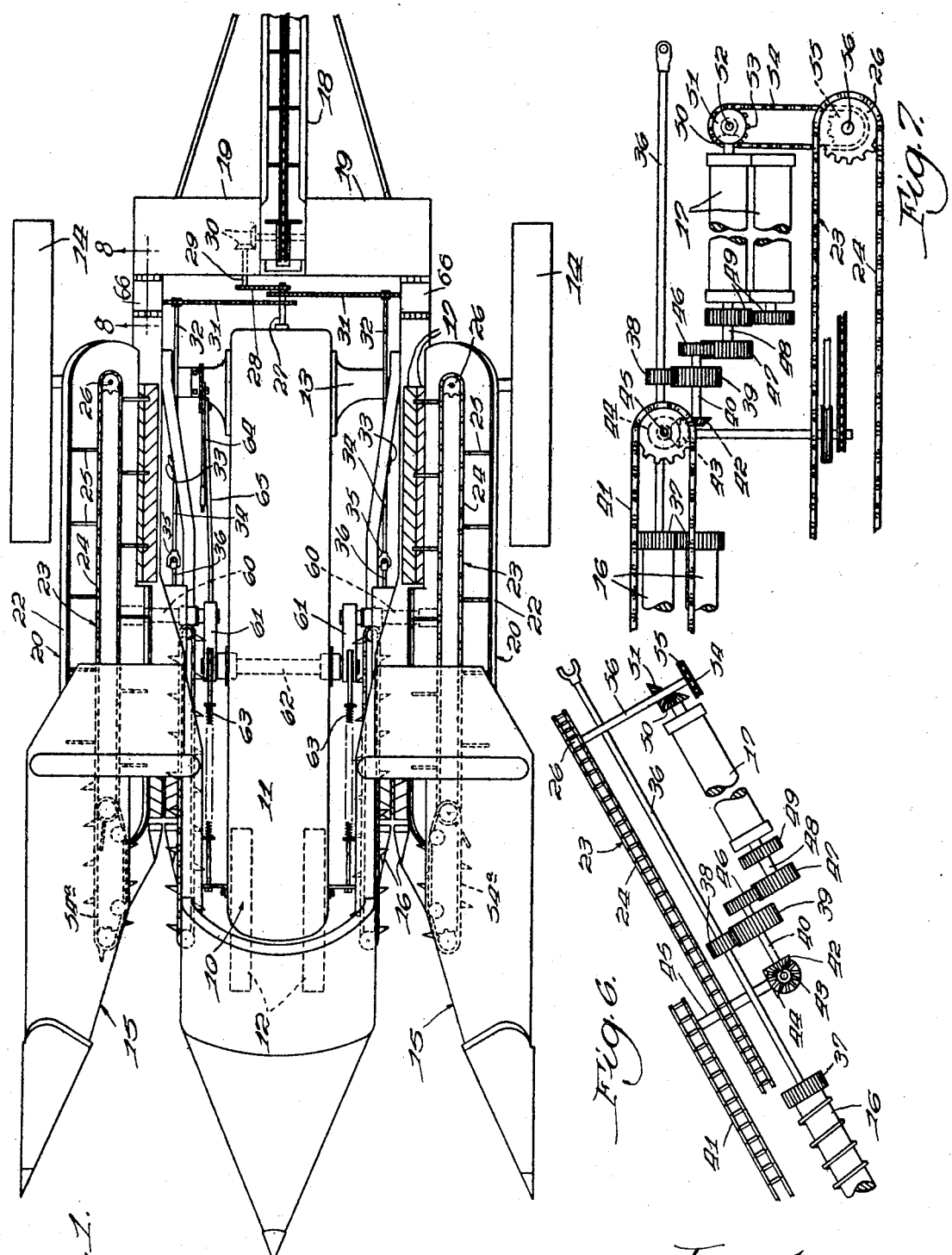
Inventors:
Benjamin M. Hyman
and John L. Aasland.
By Paul O. Pippel
Atty.

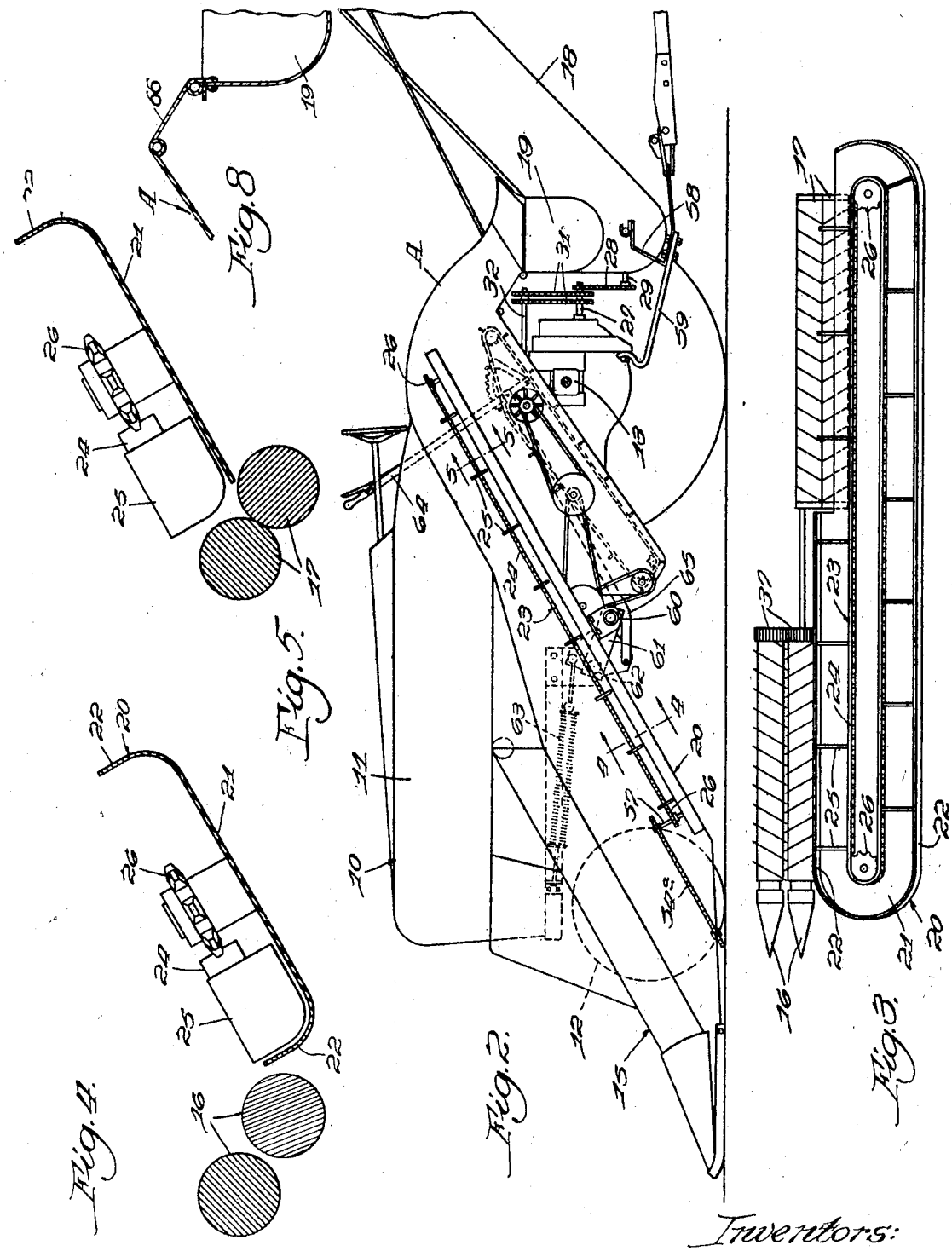

Patented June 13, 1944

2,351,515

UNITED STATES PATENT OFFICE 2,351,515

CORN PICKER

Benjamin M. Hyman and John L. Aasland, Moline, Ill., assignors to International Harvester Company, a corporation of New Jersey Application January 2, 1942, Serial No. 425,406

9 Claims. (Cl. 56—18)

This invention relates to a harvester. More specifically it relates to a tractor-mounted corn picker.

The principal drawback with most corn pickers is that they are very heavy and unwieldly because of the husking and snapping rolls and the mechanism which is necessarily associated therewith. In most cases the snapping rolls and the husking rolls cannot be reduced in weight below a certain minimum, and, consequently, any saving in weight must necessarily be effected in other parts of the picker. Generally there is an elevator for transferring ears of corn from the snapping rolls, and there is also an ear-forwarder for moving the ears along the husking rolls for husking. With the present invention the husking rolls and the snapping rolls are so arranged that a single mechanism is employed for transferring ears of corn from the snapping rolls to the husking rolls and for moving the ears along the husking rolls.

An object of the present invention is to provide an improved harvester.

A further object is the provision of an improved corn picker.

Another object is to provide an improved tractor-mounted corn picker.

According to the present invention, a corn picker mounted upon a tractor comprises snapping rolls, husking rolls extending in general alinement with the snapping rolls, though slightly offset therefrom, and a conveyor which, because of the slight offset of the husking rolls from the snapping rolls, extends along the snapping rolls so as to convey snapped ears along but out of contact with the snapping rolls, and along and partially over the husking rolls so as to move snapped ears along and in contact with the husking rolls for husking.

In the drawings—

Figure 1 is a plan view showing the corn picker of the present invention mounted upon a tractor;

Figure 2 is a side view, partly in section, of the picker mounted upon a tractor;

Figure 3 is an enlarged plan view of the snapping and husking rolls of the picker and the conveyer extending between them;

Figure 4 is a sectional view taken along the line 4—4 of Figure 2;

Figure 5 is a sectional view taken along the line 5—5 of Figure 2;

Figures 6 and 7 are schematic views, showing parts of the drive of the corn picker; and Figure 8 is a sectional view taken on the line 8—8 of Figure 1.

Reference character 10 designates a tractor having a narrow longitudinally extending body 11, a narrow front truck 12, a rear axle 13, and rear wheels 14. Mounted upon the tractor 10 is a corn picker comprising identical picking units 15 positioned at opposite sides of the tractor. Each picker unit 15 comprises essentially a pair of snapping rolls 16 and a pair of husking rolls 17. Positioned at the rear of the tractor is a wagon elevator 18 having chutes 19 connected therewith for receiving ears of corn from the husking rolls 17 and transferring them to the wagon elevator 18. The snapping rolls 16 extend upwardly and rearwardly in the usual way and the husking rolls 17 also extend upwardly and rearwardly but are offset vertically downwardly from the snapping rolls, as shown in Figures 2 and 6, and are offset horizontally from the snapping rolls, as viewed in Figures 1 and 3. Because the husking rolls 17 extend upwardly and rearwardly as do the snapping rolls 16, it is possible to employ a single means both for transferring ears of corn from the snapping rolls to the husking rolls and for moving the ears along the husking rolls for husking. This means is illustrated in Figures 3, 4, and 5. It is seen to include a pan member 20 having a wide bottom 21 and sides 22 extending at right angles to the bottom 21. As seen in Figure 4, the bottom 21 slopes downwardly toward the snapping rolls 16, and the side 22 adjacent the snapping rolls forms with the bottom 21 a trough extending alongside the snapping rolls for receiving ears snapped by the rolls. This trough is generally alongside the lower snapping roll and somewhat below the upper snapping roll. The trough extends upwardly beyond the snapping rolls and to the lower end of the husking rolls. Along the husking rolls there is no side 22 and the bottom 21 is considerably cut away. As seen in Figure 5, the husking rolls are somewhat lower with respect to the bottom 21 than are the snapping rolls, so that the bottom slopes downwardly toward a point intermediate the husking rolls and the lower husking roll is generally below the bottom. The pan 20 contains a conveyor 23 which is in the form of a sprocket chain loop 24 having flights 25 attached thereto. Within the ends of the chain loop 24 are sprockets 26. The conveyor 23 is driven so as to move ears of corn snapped by the rolls 16 along the trough formed by the bottom 21 and the side 22 of the pan 20 from the snapping rolls onto the husking rolls. The conveyor 23 also moves the corn ears along the husking rolls and in contact therewith so as to cause them to be husked by the rolls. After the ears have passed off the end of the husking rolls, they fall into the chutes 19 and are transferred to a wagon by means of the wagon elevator 18. Since the trough formed by the bottom and the one side of the pan is of V-shape and extends along the rolls, the ears of corn move lengthwise of the rolls and are discharged on the husking rolls in a position longitudinal of the husking rolls.

The drive for the various parts described originates with the power take-off shaft 27 extending from the rear of the tractor 10. A sprocket chain 28 drives a shaft 29 which in turn drives meshing bevel gears 30 which drive the wagon elevator 18. Sprocket chains 31 extend in opposite directions from the power take-off shaft 27 to shafts 32 extending along the picker unit 15. Each shaft 32 is connected by a universal joint 33 to a shaft 34 connected in turn by a universal joint 35 to a shaft 36 extending from the end of one snapping roll 16. As seen in Figures 6 and 7, spur gear sections 37 on the ends of the snapping rolls 16 transfer drive from one snapping roll to the other, and a spur gear 38 on the shaft 36 drives a spur gear 39 mounted upon a jack shaft 40. Drive is transmitted from the jack shaft 40 to a gathering chain 41 through bevel gears 42, 43, and 44 and a shaft 45. A spur gear 46 on the shaft 40 drives one husking roll 17 through a spur gear 47 and a shaft 48 extending from the husking roll. Drive is transmitted from one husking roll to another by spur gears 49. Drive is transmitted from the one husking roll 17 to the sprocket chain loop 23 through a bevel gear 50 on the end of the husking roll 17, a bevel gear 51 meshing with the gear 50, a shaft 52 on which the gear 51 is mounted, a sprocket 53 on the shaft 52, chain 54, sprocket 55, and shaft 56 to which the upper shaft 26 is secured. The sprocket 26 in the lower end of the sprocket chain loop 24 drives a shaft 57 which, in turn, drives a gathering chain 54a.

The wagon elevator 18 is carried in a bracket 58 secured to a draw-bar 59 secured at the rear of the tractor 10. The picking units 15 are carried at mid-points upon members 60 which are secured to crank arms 61 mounted upon a rock-shaft 62 secured beneath the tractor body 11. Springs 63 counterbalance the weight of the picking units 15, and a lever 64 connected to the picking units by means of a link 65 connected to one crank arm 61 is used for adjustment of the picking unit. The upper end of each unit A is connected to a chute 19 by a link 66 in the manner shown in Figure 8.

It will be apparent from the foregoing description that a new and novel corn picker construction has been provided, which makes possible the use of a single mechanism for conveying ears of corn from snapping rolls to husking rolls and also for moving the ears along the husking rolls for husking. This is made possible by the general alinement of the husking rolls with the snapping rolls. There is, however, sufficient offset between the husking rolls and snapping rolls so that the single mechanism moves the ears snapped by the snapping rolls along but out of contact with the snapping rolls and along and in contact with the husking rolls. This single mechanism includes a chain member having a bottom inclined toward the snapping rolls and also a side sloping away from the rolls, the side forming with the bottom a trough for the reception of snapping ears. The ears of corn are moved up the pan member by means of a sprocket chain loop having conveying elements thereon. Because the bottom of the pan is inclined toward the rolls, the ears of corn moved along the pan from the snapping rolls to the husking rolls are assured of positive contact with the husking rolls for husking, and, moreover, the trough formed by the bottom and side of the pan member is lower for a given height of a sprocket within the sprocket chain loop in the pan. Thus, for a given height of a sprocket within the lower end of the chain loop the trough may reach a lower point and thus may be closer to the end of the snapping rolls. This is to be seen from Figure 4. Since the pan 20 slopes toward the snapping rolls 16, the trough formed by the bottom 21 and lower side 22 is lower than it would be if the pan were flat. Thus a lower point in the snapping rolls is reached.

The intention is to limit the invention only within the scope of the appended claims.

What is claimed is:

1. In combination, a supporting frame adapted to be moved in a certain direction over the ground, snapping rolls positioned on the supporting frame and extending in the direction of movement of the frame, means mounting the snapping rolls on the frame, husking rolls positioned on the frame offset from the snapping rolls transversely of the direction of movement and extending in the direction of movement and having their entire length beyond the snapping rolls, a conveyor extending along the snapping rolls and the husking rolls and being offset from the snapping rolls a greater amount than from the husking rolls, and means mounting the conveyor on the frame, whereby ears of corn snapped by the snapping rolls are forwarded by the conveyor along the snapping rolls but out of contact therewith and are advanced by the conveyor along and in contact with the husking rolls for husking.

2. In combination, a supporting frame adapted to be moved in a certain direction over the ground, snapping rolls positioned on the supporting frame and extending downwardly in the direction of movement of the frame, means mounting the snapping rolls on the frame, husking rolls positioned on the frame offset from the snapping rolls transversely of the direction of movement and extending downwardly in the direction of movement and having their entire length beyond the snapping rolls and to the rear thereof, means mounting the husking rolls on the frame, a conveyor extending along the snapping rolls and the husking rolls and being offset from the snapping rolls a greater amount than from the husking rolls, and means mounting the conveyor on the frame, whereby ears of corn snapped by the snapping rolls are forwarded by the conveyor along the snapping rolls but out of contact therewith and are advanced by the conveyor along and in contact with the husking rolls for husking.

3. In combination, a supporting frame, snapping means, means mounting the snapping means on the supporting frame, husking means, means mounting the husking means on the frame, a single continuous conveyor having one portion extending along and spaced laterally from the snapping means so as to receive snapped ears and to convey them along and out of contact with the snapping means and another portion extending along and over the husking means so as to move ears along and in contact with the husking means for husking, and means mounting the conveyor on the supporting frame.

4. In combination, a longitudinal frame, snapping rolls carried by the frame and extending along the length thereof, husking rolls carried by the frame and extending along the length thereof substantially as extensions of the snapping rolls and offset laterally with respect thereto, and a conveyor mounted on the frame to run along the rolls and positioned to pass alongside the snapping rolls and over the husking rolls.

5. In combination, a longitudinal frame, snapping rolls carried by the frame and extending in the direction of the length thereof, means substantially paralleling and spaced laterally from the snapping rolls for supporting ears snapped by said rolls, husking rolls carried by the frame and extending in the direction of the length thereof beyond and offset from the snapping rolls, and a conveyor carried by the frame and positioned thereon to pass over the supporting means and then over the husking rolls.

6. In combination, a supporting means, a pair of inclined snapping rolls, means mounting the snapping rolls on the supporting means, an inclined elevator positioned alongside the snapping rolls and comprising a pan member having a bottom and sides, the bottom sloping downwardly toward the snapping rolls in a plane at right angles to the length of the rolls and the pan and the side of the pan member adjacent the snappingd rolls sloping downwardly away from the rolls so as to be joined with the bottom at a lowermost portion adapted to receive ears of corn from the snapping rolls, a conveyor comprising a flexible loop member positioned in the pan, and rotatable elements positioned within the ends of the loop on axes extending at right angles to the base of the pan memebr, and means mounting the elevator on the supporting means.

7. In combination, a supporting means, a pair of inclined snapping rolls, means mounting the snapping rolls on the supporting means, a pair of husking rolls inclined in the same direction as the snapping rolls, means mounting the husking rolls on the supporting means, and means for receiving ears snapped by the snapping rolls and moving them along and in contact with the husking rolls, said last-mentioned means comprising a pan extending along the snapping rolls and husking rolls and having a bottom sloping downwardly toward the rolls in a plane at right angles to the length of the rolls and the pan and a side extending along the snappingd rolls and sloping away therefrom so as to form with the bottom a trough for the reception of the ears snapped by the snapping rolls, there being no side but only a bottom at the portion of the pan extending along the husking rolls, the ears of corn thereby moving into contact with the husking rolls upon reaching this portion of the pan, and means for moving the ears of corn from the snapping rolls along the pan into contact with the husking rolls.

8. In combination, a supporting frame adapted to be moved over the ground in a certain direction, snapping rolls extending in the said certain direction, means mounting the snapping rolls on the supporting frame, husking rolls extending in the said certain direction of movement and being offset from the snapping rolls transversely to the said certain direction and being entirely rearward of the snapping rolls in the said certain direction, means mounting the husking rolls on the supporting frame, a single continuous conveyor extending along and spaced laterally of the snapping rolls and over the husking rolls so as to convey ears snapped by the snapping rolls along the snapping rolls but out of contact therewith and to convey the said snapped ears along and in contact with the husking rolls for husking, and means mounting the conveyor on the supporting frame.

9. In combination, a supporting frame adapted to be moved over the ground in a certain direction, snapping rolls extending downwardly in the said certain direction of movement, means mounting the snapping rolls on the supporting frame, husking rolls extending downwardly in the said certain direction of movement and being offset from the snapping rolls transversely to the said certain direction and being entirely rearward of the snapping rolls in the said certain direction, means mounting the husking rolls on the supporting frame, a single continuous conveyor extending along and spaced laterally of the snapping rolls and over the husking rolls so as to convey ears snapped by the snapping rolls along the snapping rolls but out of contact therewith and to convey the said snapped ears along and in contact with the husking rolls for husking, and means mounting the conveyor on the supporting frame.

BENJAMIN M. HYMAN.
JOHN L. AASLAND.